(12) United States Patent
Miao et al.

(10) Patent No.: US 11,988,572 B1
(45) Date of Patent: May 21, 2024

(54) DEVICE FOR MEASURING LENGTH AND CENTER OF MASS OF CONICAL WORKPIECE

(71) Applicant: BEIJING AEROSPACE INSTITUTE FOR METROLOGY AND MEASUREMENT TECHNOLOGY, Beijing (CN)

(72) Inventors: Yinxiao Miao, Beijing (CN); Fengju Sun, Beijing (CN); Qigang Huang, Beijing (CN); Lei Yan, Beijing (CN); Tian Bai, Beijing (CN); Xiaosan Wang, Beijing (CN); Ruidong Huo, Beijing (CN); Bingtao Gao, Beijing (CN); Yimeng Guo, Beijing (CN)

(73) Assignee: BEIJING AEROSPACE INSTITUTE FOR METROLOGY AND MEASUREMENT TECHNOLOGY, Beijing (CN)

( * ) Notice: Subject to any disclaimer, the term of this patent is extended or adjusted under 35 U.S.C. 154(b) by 0 days.

(21) Appl. No.: 18/412,018

(22) Filed: Jan. 12, 2024

(30) Foreign Application Priority Data

Jan. 13, 2023 (CN) .......................... 202310058877.5

(51) Int. Cl.
*G01M 1/12* (2006.01)
*G01B 11/02* (2006.01)

(52) U.S. Cl.
CPC ............. *G01M 1/122* (2013.01); *G01B 11/02* (2013.01)

(58) Field of Classification Search
CPC .......... G01M 1/02; G01M 1/122; G01B 11/02
See application file for complete search history.

(56) References Cited

U.S. PATENT DOCUMENTS

| | | | | |
|---|---|---|---|---|
| 3,037,376 A | * | 6/1962 | Grant | G01M 1/122 73/487 |
| 4,726,222 A | * | 2/1988 | Schueller | G01M 1/122 73/65.04 |
| 6,098,025 A | | 8/2000 | Bae | |
| 10,801,909 B2 | * | 10/2020 | Lin | G01M 1/122 |
| 11,371,874 B2 | * | 6/2022 | Wang | G01M 1/122 |

(Continued)

FOREIGN PATENT DOCUMENTS

| | | |
|---|---|---|
| CN | 102620887 A | 8/2012 |
| CN | 104034478 A | 9/2014 |
| CN | 110646136 A * | 1/2020 ............. G01B 11/02 |

(Continued)

*Primary Examiner* — Natalie Huls

(57) ABSTRACT

A device for measuring length and center of mass of conical workpiece, including an inner frame, an outer frame, a base plate, two laser displacement sensors and a plurality of weighing mechanisms. The inner frame is rotatably connected with the outer frame through a pin shaft. A bottom surface of the conical workpiece can be fixedly connected with an inner bottom surface of the inner frame. The base plate is removably arranged on the inner frame, and abuts against a top of the conical workpiece. The base plate is perpendicular to an axis of the conical workpiece. The laser displacement sensors are fixedly arranged at a position of the inner frame below the top of the conical workpiece. The weighing mechanisms are provided at a bottom of the outer frame, and can bear the inner frame, the outer frame and the conical workpiece.

6 Claims, 6 Drawing Sheets

(56) References Cited

U.S. PATENT DOCUMENTS 11,828,671 B2 * 11/2023 Keibach .................. B23Q 17/20
2016/0138994 A1 * 5/2016 Park ...................... G01M 1/122
                                                            73/65.04

FOREIGN PATENT DOCUMENTS

| CN | 110646136 | A |   | 1/2020 |
| CN | 114112191 | A | * | 3/2022 |
| CN | 114112191 | A |   | 3/2022 |
| CN | 114942102 | A | * | 8/2022 |
| CN | 115077793 | A | * | 9/2022 |
| CN | 116164883 | A | * | 5/2023 |

* cited by examiner

DEVICE FOR MEASURING LENGTH AND CENTER OF MASS OF CONICAL WORKPIECE

CROSS-REFERENCE TO RELATED APPLICATIONS

This application claims the benefit of priority from Chinese Patent Application No. 202310058877.5, filed on Jan. 13, 2023. The content of the aforementioned application, including any intervening amendments thereto, is incorporated herein by reference in its entirety.

TECHNICAL FIELD

This application relates to length and center-of-mass measurement, and more particularly to a device for measuring length and center of mass of a conical workpiece.

BACKGROUND

The current center-of-mass measurement methods mainly include static measurement and dynamic measurement. The static measurement mainly includes a hanging method and a multi-point weighing method. The dynamic measurement mainly includes a compound-pendulum method, a rotational inertia method and a rotation balance method. In the above methods, the multi-point weighing method has been widely used because of the simple and convenient operation, low cost and excellent applicability to the measurement of large-size products, such as rockets, satellites, missiles, and submarines.

Regarding the multi-point weighing method, the center of mass of the product to be measured is determined based on readings of three (or four) weighing sensors and their relative position relationships. When using the multi-point weighing method to measure an axial center of mass of a conical workpiece, it is necessary to measure a length of the conical workpiece before determining the axial center of mass. However, the traditional center-of-mass measuring device cannot measure both the length and the axial center of mass of a conical workpiece.

SUMMARY

In view of the above problems, this application provides a device for measuring length and center of mass of a conical workpiece, which enables the simultaneous measurement of the length and axial center of mass of conical workpieces.

This application provides a device for measuring length and center of mass of a conical workpiece, comprising:
  an inner frame;
  an outer frame;
  a base plate;
  two laser displacement sensors; and
  a plurality of weighing mechanisms;
  wherein the inner frame is in rotatable connection with the outer frame through a pin shaft;
  an inner bottom surface of the inner frame is configured to be fixedly connected with a bottom surface of the conical workpiece;
  the base plate is removably arranged at the inner frame, and is configured to abut against a top of the conical workpiece; and the base plate is perpendicular to an axis of the conical workpiece;
  the two laser displacement sensors are fixedly arranged at a position of the inner frame below the top of the conical workpiece; and
  the plurality of weighing mechanisms are provided at a bottom of the outer frame;
  and the plurality of weighing mechanisms are configured to bear a the inner frame, the outer frame and the conical workpiece.

In an embodiment, a slewing bearing is fixedly provided on the inner bottom surface of the inner frame; and
  the conical workpiece is configured to be coaxially and fixedly connected with the slewing bearing to rotate with the slewing bearing.

In an embodiment, the device further includes a counterweight block;
  the counterweight block is fixedly arranged on the inner frame and is configured to adjust a center of mass of a whole of the inner frame and the conical workpiece to an axis of the pin shaft.

In an embodiment, the slewing bearing is configured to be driven by a rotary drive unit to drive the conical workpiece to rotate around its own axis for measurement of a Y-axis center of mass and a Z-axis center of mass of the conical workpiece; and center-of-mass measurement data is collected in real time during a rotation process.

In an embodiment, when measuring the axial center of mass of the conical workpiece, the conical workpiece is rotated to be axially horizontal through the inner frame, and an axial center-of-mass coordinate of the conical workpiece is obtained according to a distance between the axial center of mass and the axis of the pin shaft, a distance between the axis of the pin shaft and the bottom surface of the conical workpiece and a whole length of the conical workpiece.

In an embodiment, the device further includes a base, a support mechanism and a measuring platform;
  the support mechanism is fixedly arranged on a top of the base;
  a bottom surface of the measuring platform is configured to be supported on the support mechanism; and a top surface of the measuring platform is fixed with a bottom of the outer frame;
  the plurality of weighing mechanisms are circumferentially and evenly distributed between a top surface of the base and the bottom surface of the measuring platform; each of the plurality of weighing mechanisms includes a weighing sensor and a first jacking mechanism; and the first jacking mechanism is fixedly connected with the weighing sensor; and
  the first jacking mechanism is configured to lift the measuring platform through jacking up the weighing sensor to separate the measuring platform from the support mechanism, so that the measuring platform, the outer frame, the inner frame and the conical workpiece are supported by the weighing sensor.

In an embodiment, the bottom surface of the measuring platform is provided with a plurality of ball heads distributed in triangle;
  a top surface of the support mechanism is provided with a plurality of ball sockets in one-to-one correspondence to the plurality of ball heads; and
  when the bottom surface of the measuring platform is supported on the support mechanism, an outer circumferential surface of each of the plurality of ball heads is in circumferential contact with an inner circumferential surface of a corresponding one of the plurality of ball sockets.

In an embodiment, the measuring device further includes a torsion bar, a torsional-pendulum drive mechanism and a torsional-pendulum brake mechanism;

the support mechanism is an air bearing;

a first end of the torsion bar is fixedly connected with the base, and a second end of the torsion bar is fixedly connected with a rotor of the air bearing; and the torsion bar is coincident with an axis of the slewing bearing;

the torsional-pendulum drive mechanism and the torsional-pendulum brake mechanism are fixedly arranged on the base;

the torsional-pendulum drive mechanism is configured to drive the measuring platform to rotate by a preset angle to make the torsion bar be in a torsional state; and the torsion bar is configured to release a torsional stress to allow the measuring platform to drive the conical workpiece to perform torsional pendulum; and the torsional-pendulum brake mechanism is configured to stop the torsional pendulum of the measuring platform.

In an embodiment, the measuring device further includes a second jacking mechanism; the second jacking mechanism is circumferentially and evenly distributed between the top surface of the base and the bottom surface of the measuring platform; and the second jacking mechanism is configured to jack up the measuring platform to make the measuring platform leave the support mechanism.

Compared to the prior art, this application has the following beneficial effects.

(1) The inner frame is in rotatable connection with the outer frame through a pin shaft; the inner bottom surface of the inner frame is configured to be fixedly connected with the bottom surface of the conical workpiece; the base plate is removably arranged at the inner frame, and is configured to abut against the top of the conical workpiece; and the base plate is perpendicular to the axis of the conical workpiece; the two laser displacement sensors are fixedly arranged at a position of the inner frame below the top of the conical workpiece; and the plurality of weighing mechanisms are provided at the bottom of the outer frame; and the plurality of weighing mechanisms are configured to bear the inner frame, the outer frame and the conical workpiece; in this way, laser can be emitted from the two laser displacement sensors to the base plate so as to obtain a distance between each of the two laser displacement sensors and the top of the conical workpiece; and a distance between the position of the two laser displacement sensors and a large end of a surface of the conical workpiece can be directly obtained by measuring a distance between the position of the two laser displacement sensors and the inner bottom surface of the inner frame, so as to obtain a total length of the conical workpiece; and when measuring the center of mass of the conical workpiece, a center-of-mass coordinate of the conical workpiece can be obtained according to multiple-point weighing principle only the bottom of the outer frame is born by the plurality of weighing mechanisms, that is, the length and the center of mass of the conical workpiece can be measured in one device, which has simple and quick operation; and the length of the conical workpiece can be measured without another length measuring device.

(2) The slewing bearing is fixedly arranged on the inner bottom surface of the inner frame; and the conical workpiece is configured to be coaxially and fixedly arranged with the slewing bearing to rotate with the slewing bearing; in this way, the device can measure the center of mass of the conical workpiece by different rotation angles; and enough center of mass data can be obtained because rotation angles can be more enough, so as to obtain a more accurate center of mass of the conical workpiece.

(3) The counterweight block is fixedly arranged on the inner frame and is configured to adjust the center of mass of the whole of the inner frame and the conical workpiece to the axis of the pin shaft; in this way, though a mass of the whole of the inner frame and the conical workpiece is very large, it is convenient to rotate the inner frame by 90° around the pin shaft to make the cone work piece in horizontal state, so as to finish measurement of the axial center of mass of the conical workpiece.

(4) The bottom surface of the measuring platform is provided with the plurality of ball heads distributed in triangle; and the support mechanism is provided with the plurality of ball sockets in one-to-one correspondence to the plurality of ball heads; the outer circumferential surface of each of the plurality of ball heads is in circumferential contact with the inner circumferential surface of a corresponding one of the plurality of ball sockets; in this way, the measuring platform has a unique and determined position relative to the support mechanism in a non-measurement state through a positioning way of cooperation of the plurality of ball heads and the plurality of ball sockets; therefore, when measuring the center of mass of the conical workpiece, the measuring platform is always jacked up from a determined position, so that there is a determined position between the conical workpiece arranged on the measuring platform and the plurality of weighing sensor in a measuring state, and an accuracy of center of mass measurement is improved.

(5) The second jacking mechanism is circumferentially and evenly distributed between the top surface of the base and the bottom surface of the measuring platform; and the second jacking mechanism is configured to jack up the measuring platform to make the measuring platform leave the support mechanism; in this way, when arranging the conical workpiece, the measuring platform can be jacked up to leave the support mechanism through the second jacking mechanism, so as to avoid impact of the support mechanism and ensure the accuracy of subsequent center of mass measurement.

Figure 1:
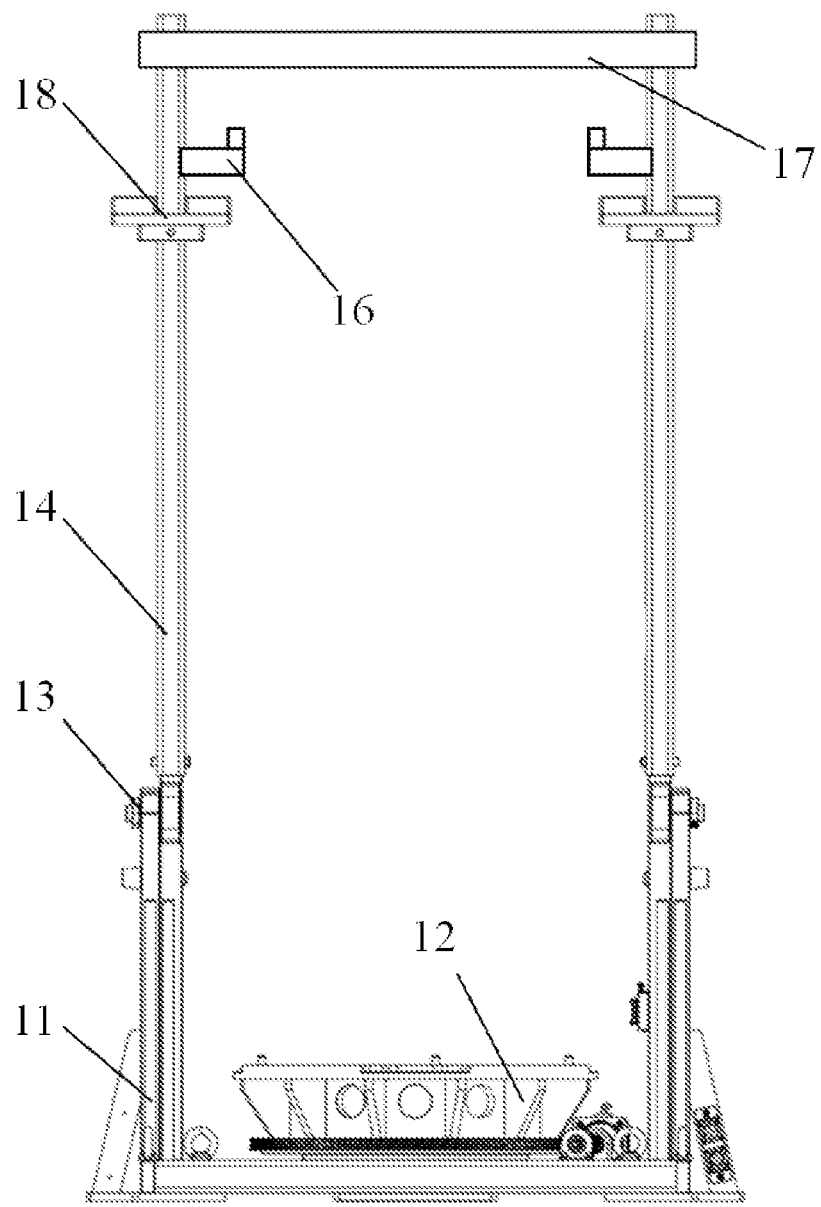
FIG. 1 shows a device for measuring length and center of mass of conical workpieces according to Embodiment 1 of the present disclosure.
Figure 2:
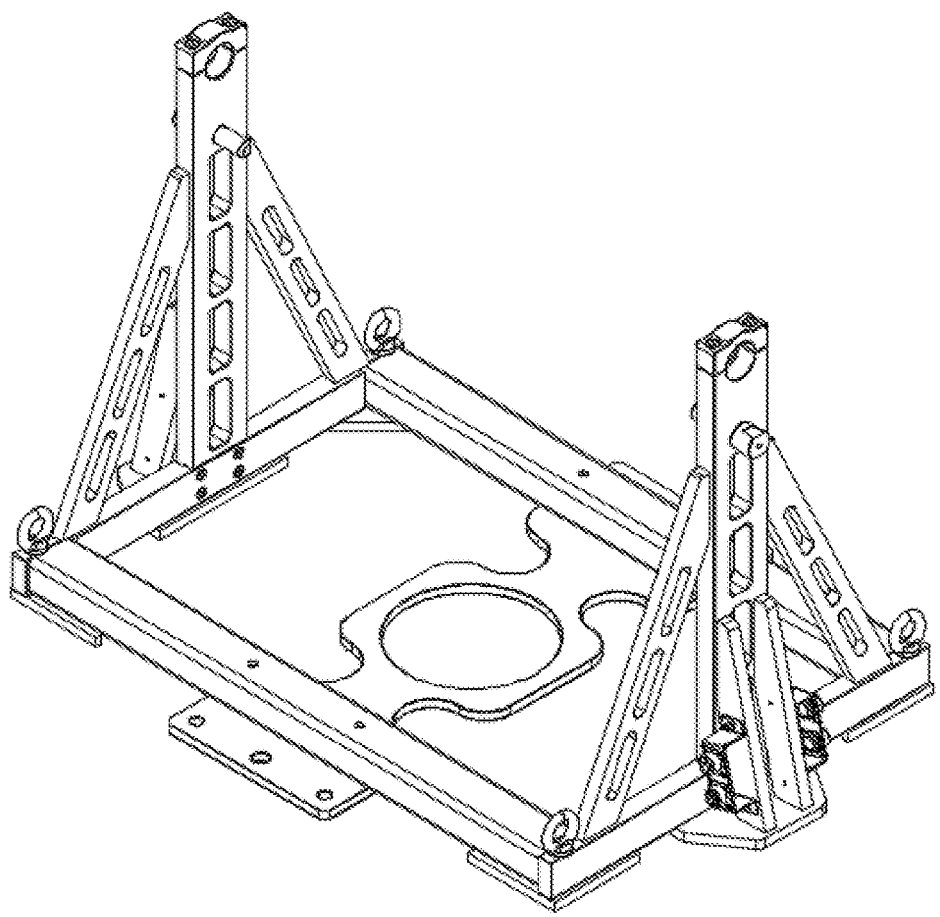
FIG. 2 schematically shows a structure of an outer frame in FIG. 1.

In the figures: adjusting support leg 1; base 2; jacking mechanism 3; displacement sensor 4; torsional-pendulum brake mechanism 5; measuring platform 6; torsion bar 7; weighing mechanism 8; T-shaped air bearing 9; torsional-pendulum drive mechanism 10; outer frame 11; slewing bearing 12; rotating pin shaft 13; inner frame 14; conical workpiece 15; laser displacement sensor 16; base plate 17; counterweight block 18; positioning part 19; and fixing pin 20.

DETAILED DESCRIPTION OF EMBODIMENTS

The present disclosure will be further described below with reference to the accompanying drawings and embodiments.

Embodiment 1

First, a coordinate system of a device for measuring length and center of mass of a conical workpiece 15 and a coordinate system of the conical workpiece 15 are defined. For the device, a vertical direction is defined as an X-axis direction, a horizontal direction is defined as a Z-axis direction, and a direction which is perpendicular to the Z-axis direction in the horizontal plane is defined as a Y-axis direction, so that a right-handed cartesian coordinate system is built. For the conical workpiece 15, an axial direction is defined as the X-axis direction. When the conical workpiece 15 is placed vertically (that is, the axial direction is along the vertical direction), a Z-axis direction and a Y-axis direction of the conical workpiece 15 are the same as the Z-axis direction and the Y-axis direction of the coordinate system of the device.

Referring to FIGS. 1-6, the device includes an inner frame 14, an outer frame 11, a base plate 17, two laser displacement sensor 16, and a plurality of weighing mechanisms 8.

The inner frame 14 is in rotatable connection with the outer frame 11 through a rotating pin shaft 13 provided along the Z-axis direction, and the inner frame 14 can rotate relative to the outer frame 11 around an axis of the rotating pin shaft 13. In addition, a slewing bearing 12 is fixedly provided on an inner bottom surface of the inner frame 14, and a large end of the conical workpiece 15 is fixedly and coaxially connected with the slewing bearing 12. The slewing bearing 12 is configured to be driven by a rotary drive unit with a motor as a power source. The slewing bearing 12 and the rotary drive unit together constitute an auto-rotation motion structure, and the auto-rotation motion structure can make the slewing bearing 12 drive the conical workpiece 15 to rotate around an axis of the slewing bearing 12. Two ends of the base plate 17 are each provided with a hole, and the two ends of the base plate 17 can be removably fixed on two side bars of the inner frame 14 through the hole, respectively. A top of the conical workpiece 15 abuts against a middle of the base plate 17, and the base plate 17 is perpendicular to an axis of the conical workpiece 15. The two laser displacement sensors 16 are symmetrically arranged on the two side bars of the inner frame 14, and an installation height of the laser displacement sensors 16 is lower than a height of a top end of the conical workpiece 15. The weighing mechanism 8 is provided on a bottom of the outer frame 11 to bear the outer frame 11, the inner frame 14 and the conical workpiece 15. It can be understood that, in this embodiment, it is not limited that the base plate 17 is fixedly connected with the inner frame 14 through the hole provided on the two ends of the base plate 17, other ways are feasible as long as the base plate 17 is fixedly connected with the inner frame, the top of the conical workpiece 15 abuts against the middle of the base plate 17, and the base plate 17 is perpendicular to the axis of the conical workpiece 15.

In this embodiment, the laser can be emitted from the two laser displacement sensors 16 to the base plate 17 so as to obtain a distance S1 between each of the two laser displacement sensors 16 and the top of the conical workpiece 15. A distance between a position of the two laser displacement sensors 16 and a large end of a surface of a bottom of the conical workpiece 15 (that is, an end surface fixed on the slewing bearing 12, which is also a bottom surface of the conical workpiece 15) can be obtained by measuring a distance S2 between the position of the two laser displacement sensors 16 and the inner bottom surface of the inner frame 14. A total of S1 and S2 is a total length of the cone workpiece 15.

When measuring the center of mass of the conical workpiece 15, the center of mass of the conical workpiece 15 can be obtained according to the multiple-point weighing principle only the bottom of the outer frame 11 is born by the plurality of weighing mechanisms 8. Specifically, when measuring a Y-axis center of mass and a Z-axis center of mass of the conical workpiece 15, the slewing bearing 12 is configured to be driven by the rotary drive unit to drive the conical workpiece 15 to rotate around its axis. Center-of-mass measurement data is collected in real time by the weighing mechanisms 8 during a rotation process. In this embodiment, the date is collected every 1° of rotation of the conical workpiece 15. After the conical workpiece 15 rotates a full circle, which is also 360°, measurement results at multiple angles can theoretically obtain a series of center-of-mass coordinate values around a rotation axis which is a central axis of the slewing bearing 12. A curve formed by the series of center-of-mass coordinate values is a circle with a radius of r in theory, and r represents a distance from the center of mass to the rotation axis. In practical measurement, the series of center-of-mass coordinate values can be fitted into a circle.

Figure 4:
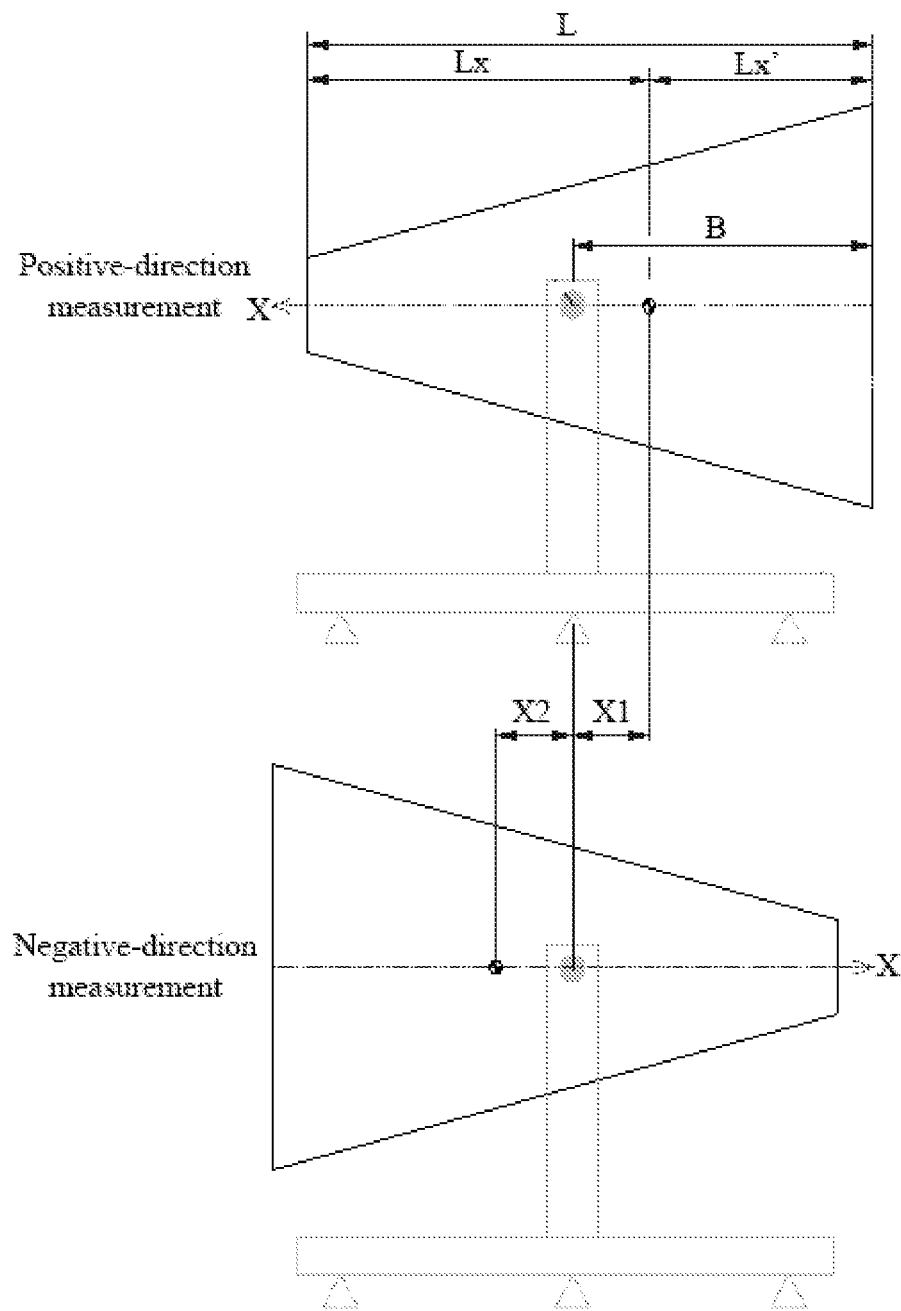
FIG. 4 schematically shows axial center-of-mass measurement of the conical workpiece according to an embodiment of the present disclosure.
Figure 5:
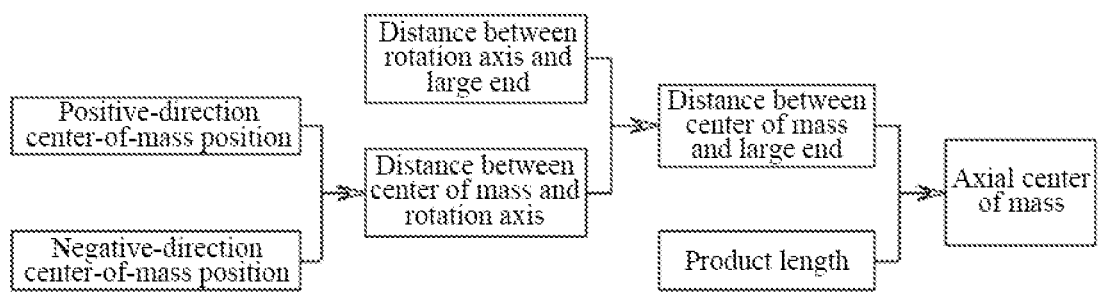
FIG. 5 is a flow chart of the axial center-of-mass measurement of the conical workpiece according to an embodiment of the present disclosure.

As shown in FIG. 4 (in FIG. 4, the top of the conical workpiece 15 is flat, and a complete conical workpiece 15 is not shown), the axial center of mass, which is also the X-axis center of mass, is measured based on the center-of-mass weighing principle of the three-point weighing method. The conical workpiece 15 is rotated to be axially horizontal through the inner frame 14 (which can be limited by a fixing pin 20 to ensure a stability of a horizontal state), and a direct measurement of the axial center of mass of the conical workpiece 15 is converted into two measurements of phase offset of the axial center of mass through a positive-direction measurement and a negative-direction measurement, so as to calculate a distance between the axial center of mass and an axis of the rotating pin shaft 13. In addition, a distance between the axis of the rotating pin shaft 13 and the large end of the surface of the conical workpiece 15 can be directly measured, so as to obtain a distance between the axial center of mass and the conical workpiece 15, and an axial center-of-mass coordinate of the conical workpiece 15 can be obtained according to the whole length of the conical workpiece 15, which is specifically shown in FIG. 5. In FIG. 5, the large end represents the large end surface of the conical workpiece 15, which is fixed on the slewing bearing 12 (that is, the bottom surface of the conical workpiece 15), and a distance from the axial center of mass to the rotation axis is a mean value of a positive-direction center-of-mass position X1 and a negative-direction center-of-mass position $X_2$, that is, (X1+X2)/2.

The device further includes a counterweight block 18. The counterweight block 18 is fixedly arranged on the two side bars of the inner frame 14 to adjust a center of mass of a whole of the inner frame 14 and the conical workpiece 15 to a connecting line of two pin shafts 13 (a designed center of mass of the conical workpiece 15 is located on the connecting line of the two pin shaft 13), in this way, it is convenient to rotate the conical workpiece 15 to be axially horizontal through rotating the inner frame 14, so as to satisfy a positive-direction measurement and a negative-direction measurement during an axial center of mass measurement process.

Figure 3:
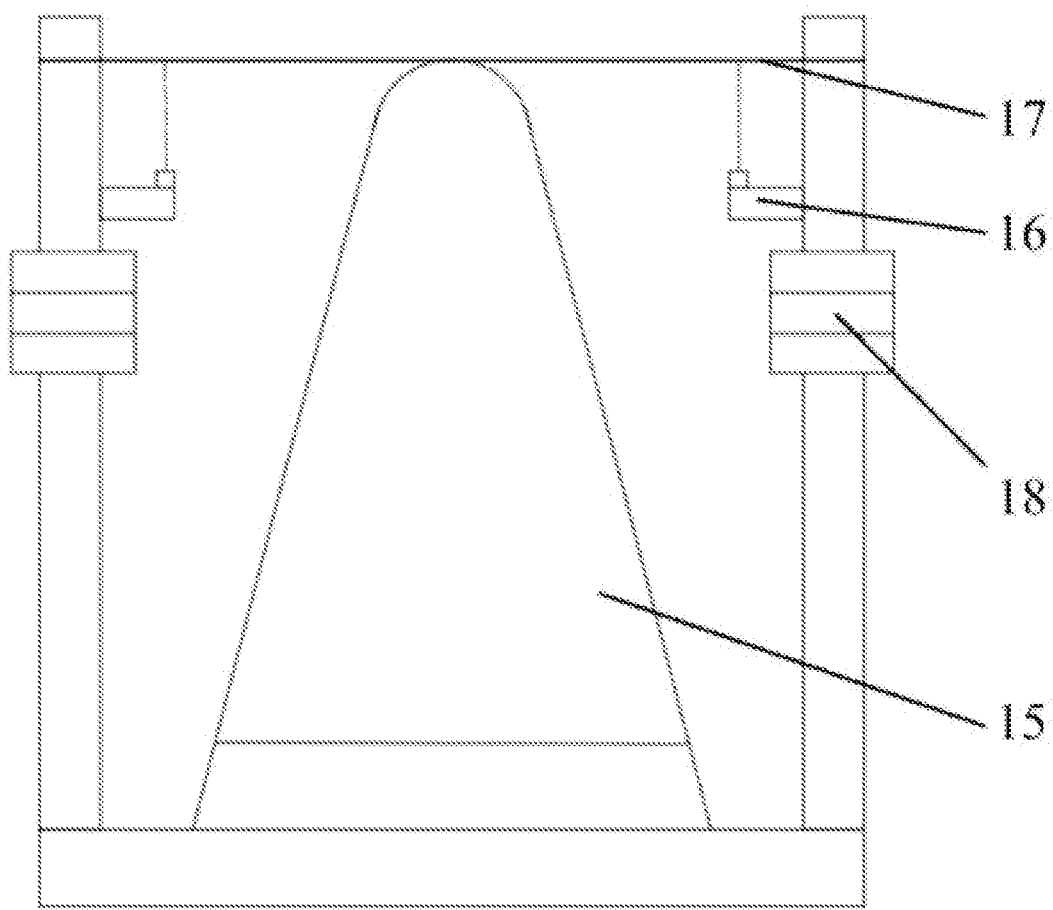
FIG. 3 schematically shows length measurement of the conical workpiece according to an embodiment of the present disclosure.

In an embodiment, the length of the conical workpiece 15 is measured by a symmetrical measurement of the two laser displacement sensors 16. As shown in FIG. 1 and FIG. 3, the two side bars of the inner frame 14 are each provided with a laser displacement sensor 16. A distance from the laser displacement sensor 16 to the bottom surface of the conical workpiece 15 is determined by processing and practical arrangement of the device, and can be calibrated in advance, which is assumed as $X^0$. When the length of the conical workpiece 15 is needed to be measured, the base plate 17 is fixed through the two side bars of the inner frame 14, and the top of the conical workpiece 15 abuts against the base plate 17. A distance from a first laser displacement sensor 16 to the base plate 17 is a distance $X_1$, and a distance from a second laser displacement sensor 16 to the base plate 17 is a distance $X_2$. And the whole length of the conical workpiece 15 is calculated as follows:

$$X = X_0 + (X_1 + X_2)/2$$

The measurement accuracy of the length of the conical workpiece 15 can be improved through the symmetrical arrangement of the two laser displacement sensors 16.

Embodiment 2

Based on Embodiment 1, this embodiment provides another method for measuring the length of the conical workpiece 15, measuring the length of the conical workpiece 15 through providing a measuring grating on the inner frame 14. In this way, the base plate 17 of the measuring device can be omitted. Specifically, the measuring grating is fixedly arranged at a position of the two side bars of the inner frame 14 from the slewing bearing 12 at a height L1, and a light curtain emitted from the measuring grating and a slewing axis of the slewing bearing 12 (which is also the axis of the conical workpiece 15) are located in the same plane. In this way, a length L2 of the conical workpiece 15 in the light curtain can be directly measured, and the length of the conical workpiece 15 is expressed as L1+L2.

Embodiment 3

Figure 6:
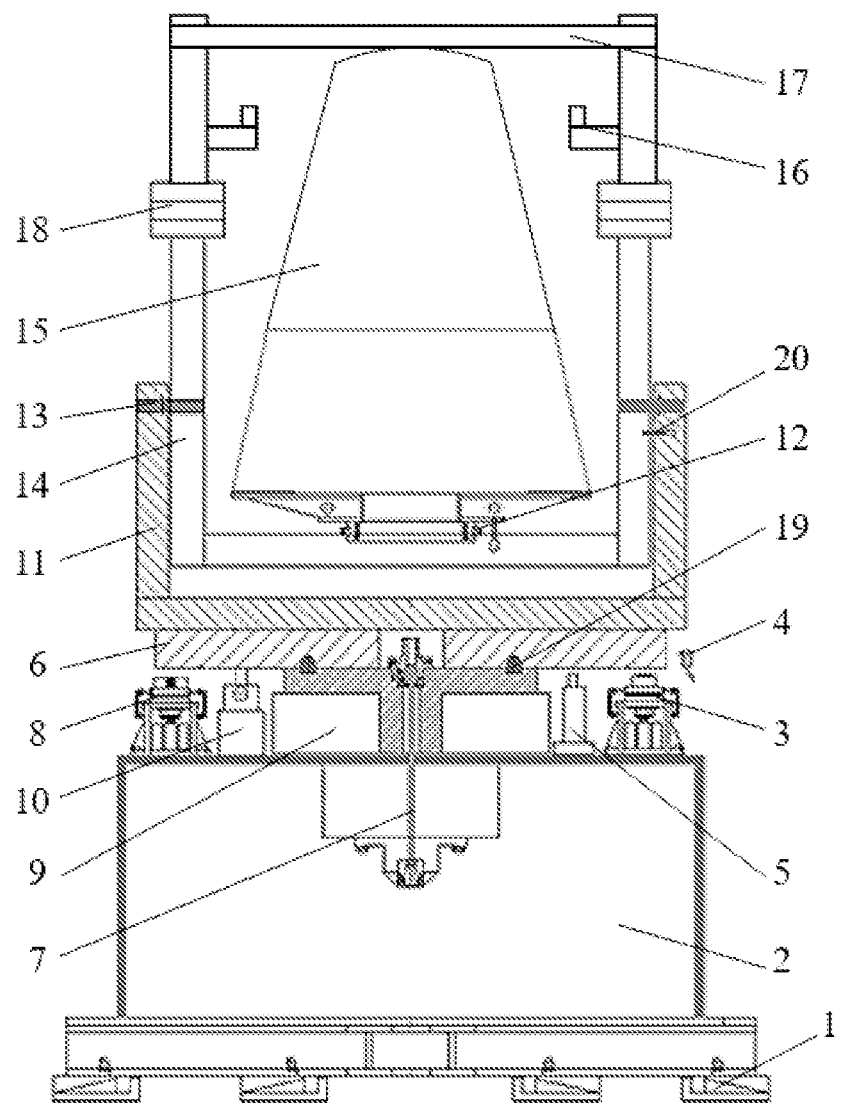
FIG. 6 schematically shows a structure of the measuring device according to Embodiment 4 of the present disclosure.

Referring to FIG. 6, the device further includes a base 2, a second jacking mechanism 3, a measuring platform 6 and a T-shaped air bearing 9.

The T-shaped air bearing 9 is fixedly arranged on a top of the base 2, and an axis of the T-shaped air bearing 9 is coincident with the axis of the slewing bearing 12. The measuring platform 6 is disc-shaped. An upper plane of the measuring platform 6 is fixedly connected with the bottom of the outer frame 11, and a lower plane of the measuring platform 6 is supported on a rotor of the T-shaped air bearing 9. A disc-shaped measuring platform 6 and the T-shaped air bearing 9 are coaxial. Three second jacking mechanisms 3 and three weighing mechanisms 8 are arranged in uniform circumferential intervals between a top surface of the base 2 and the lower plane of the measuring platform 6. The weighing mechanism 8 includes a weighing sensor and a first jacking mechanism (which is a jacking cylinder in this embodiment). The weighing sensor is fixedly connected with the first jacking mechanism, and the first jacking mechanism is configured to lift the weighing sensor. When arranging the conical workpiece 15 on the slewing bearing 12 on the inner bottom surface of the inner frame 14, the measuring platform 6 is firstly lifted through the second jacking mechanism 3 to leave the rotor of the T-shaped air bearing 9, so as to avoid impact of the T-shaped air bearing 9 when arranging the conical workpiece 15. After the conical workpiece 15 is placed, the second jacking mechanism 3 slowly descends, and the measuring platform 6 is repositioned on the rotor of the T-shaped air bearing 9.

When measuring the center of mass of the conical workpiece 15, the first jacking mechanism of the weighing mechanism is configured to lift the measuring platform 6 through the weighing sensor to separate the measuring platform 6 from the T-shaped air bearing 9. At this time, measuring platform 6, the outer frame 11, the inner frame 14 and the conical workpiece 15 are supported by three weighing sensors, so that the center-of-mass coordinate of the conical workpiece 15 can be obtained according to readings of the three weighing sensors combined with the three-point weighing principle.

In an embodiment, a bottom of the measuring platform 6 is supported on the rotor of the T-shaped air bearing 9 through a combination of a ball head and a ball socket.

Specifically, the measuring platform 6 is provided with three positioning parts distributed in triangle. A first end of each of the three positioning parts is the ball head, and a second end of each of the three positioning parts is a flange for installation. The ball head protrudes from the lower plane of the measuring platform 6. The rotor of the T-shaped air bearing 9 is provided with the ball socket in one-to-one correspondence to the head ball. The measuring platform 6 is supported on the rotor of the T-shaped air bearing 9 through the combination of the ball head and the ball socket (an outer circumferential surface of the ball head is in circumferential contact with an inner circumferential surface of the ball socket). In this way, the measuring platform 6 has an unique determined position relative to the T-shaped air bearing 9 through an over-positioning combination of three ball heads and three ball socket, that is, in each center-of-mass measurement, the measuring platform 6 is always lifted from a determined position, so that there is a determined position between the conical workpiece 15 and the weighing sensor to improve the accuracy of center-of-mass. In addition, a small lateral displacement of the measuring platform 6 is generated when is lifted resulting in fail to fully aligned with the ball socket, however, owing to a circumference of the ball socket has a guiding function to the ball head, the ball head can fall into the ball socket, so as to ensure the measuring platform 6 always has the determined position relative to the T-shaped air bearing in a non-measurement state. Therefore, the device has high precision re-positioning function.

In addition, in the process of lifting the measuring platform 6, a position of the measuring platform 6 relative to the weighing sensor is unchanged ideally. In order to avoid a change of relative position between the measuring platform 6 and the weighing sensor caused by unexpected interference, as shown in FIG. 6, two opposite sides along the Z-axis direction and two opposite sides along the Y-axis direction of an outer circumferential surface of the measuring platform 6 are each provided with a displacement sensor 4 to monitor a displacement of the measuring platform 6 in the Z-axis direction and the Y-axis direction.

It can be understood that, the T-shaped air bearing 9 of this embodiment is equivalent to a support mechanism configured to support the measuring platform 6 in the non-measurement state.

Embodiment 4

On the basis of the embodiment 3, the device further includes a torsion bar 7, a torsional-pendulum drive mechanism 10 and a torsional-pendulum brake mechanism 5. A first end of the torsion bar is fixedly connected with the base 2, and a second end of the torsion bar is fixedly connected with the rotor of the T-shaped air bearing 9. The torsion bar 7 is coincident with the slewing axis of the slewing bearing 12. The torsional-pendulum drive mechanism 10 and the torsional-pendulum brake mechanism 5 are fixedly arranged on the top of the base 2. The measuring platform 6 is configured to be driven to rotate by a preset angle and the torsion bar 7 is in a torsional state through the torsional-pendulum drive mechanism 10, so that the torsion bar 7 is configured to release a torsional stress to allow the measuring platform 6 to drive the conical workpiece 15 to perform torsional pendulum. Therefore, the device can also use the torsion-pendulum method to measure a moment of inertia of the conical workpiece 15. And after the measurement, the torsional-pendulum brake mechanism 5 is configured to quickly stop the torsional pendulum of the measuring platform 6, so as to repeatedly measure the conical workpiece 15.

Described above are only several embodiments of the present disclosure, and are not intended to limit the scope of the present disclosure. It should be noted that any modifications, equivalent replacements or improvements made by those skilled in the art without departing from the spirits and principles of the present disclosure shall fall within the scope of the present disclosure defined by the appended claims.

What is claimed is:

1. A device for measuring length and center of mass of a conical workpiece, comprising:
    a base;
    a support mechanism;
    a measuring platform;
    a torsion bar;
    a torsional-pendulum drive mechanism;
    a torsional-pendulum brake mechanism;
    an inner frame;
    an outer frame;
    a base plate;
    two laser displacement sensors; and
    a plurality of weighing mechanisms;
    wherein the inner frame is in rotatable connection with the outer frame through a pin shaft;
    an inner bottom surface of the inner frame is configured to be fixedly connected with a bottom surface of the conical workpiece;
    the base plate is removably arranged at the inner frame, and is configured to abut against a top of the conical workpiece; and the base plate is perpendicular to an axis of the conical workpiece;
    the two laser displacement sensors are fixedly arranged at a position of the inner frame below the top of the conical workpiece;
    the plurality of weighing mechanisms are provided at a bottom of the outer frame; and the plurality of weighing mechanisms are configured to bear the inner frame, the outer frame and the conical workpiece;
    a slewing bearing is fixedly provided on the inner bottom surface of the inner frame;
    the conical workpiece is configured to be coaxially and fixedly connected with the slewing bearing to rotate with the slewing bearing;
    the support mechanism is fixedly arranged on a top of the base;
    a bottom surface of the measuring platform is configured to be supported on the support mechanism, and a top surface of the measuring platform is fixed with the bottom of the outer frame;
    the plurality of weighing mechanisms are circumferentially and evenly distributed between a top surface of the base and the bottom surface of the measuring platform; each of the plurality of weighing mechanisms comprises a weighing sensor and a first jacking mechanism; and the first jacking mechanism is fixedly connected with the weighing sensor;
    the first jacking mechanism is configured to jack up the measuring platform through jacking up the weighing sensor to separate the measuring platform from the support mechanism, so that the measuring platform, the outer frame, the inner frame and the conical workpiece are supported by the weighing sensor;
    the support mechanism is an air bearing;
    a first end of the torsion bar is fixedly connected with the base, and a second end of the torsion bar is fixedly connected with a rotor of the air bearing; and the torsion bar is coincident with an axis of the slewing bearing;
    the torsional-pendulum drive mechanism and the torsional-pendulum brake mechanism are fixedly arranged on the base;
    the torsional-pendulum drive mechanism is configured to drive the measuring platform to rotate by a preset angle to make the torsion bar be in a torsional state; and the torsion bar is configured to release a torsional stress to allow the measuring platform to drive the conical workpiece to perform torsional pendulum; and
    the torsional-pendulum brake mechanism is configured to stop the torsional pendulum of the measuring platform.

2. The device of claim 1, further comprising:
    a counterweight block;
    wherein the counterweight block is fixedly arranged on the inner frame, and is configured to adjust a center of mass of a whole of the inner frame and the conical workpiece to an axis of the pin shaft.

3. The device of claim 1, wherein the slewing bearing is configured to be driven by a rotary drive unit to drive the conical workpiece to rotate around its own axis for measurement of a Y-axis center of mass and a Z-axis center of mass of the conical workpiece; and center-of-mass measurement data is collected in real time during a rotation process.

4. The device of claim 1, wherein when measuring an axial center of mass of the conical workpiece, the conical workpiece is rotated to be axially horizontal through the inner frame, and an axial center-of-mass coordinate of the conical workpiece is obtained according to a distance between the axial center of mass and an axis of the pin shaft, a distance between the axis of the pin shaft and the bottom surface of the conical workpiece and a whole length of the conical workpiece.

5. The device of claim 1, wherein the bottom surface of the measuring platform is provided with a plurality of ball heads distributed in triangle;

a top surface of the support mechanism is provided with a plurality of ball sockets in one-to-one correspondence to the plurality of ball heads; and when the bottom surface of the measuring platform is supported on the support mechanism, an outer circumferential surface of each of the plurality of ball heads is in circumferential contact with an inner circumferential surface of a corresponding one of the plurality of ball sockets.

6. The device of claim 1, further comprising:

a second jacking mechanism;

wherein the second jacking mechanism is circumferentially and evenly distributed between the top surface of the base and the bottom surface of the measuring platform; and the second jacking mechanism is configured to jack up the measuring platform to make the measuring platform leave the support mechanism.

\* \* \* \* \*